UNITED STATES PATENT OFFICE.

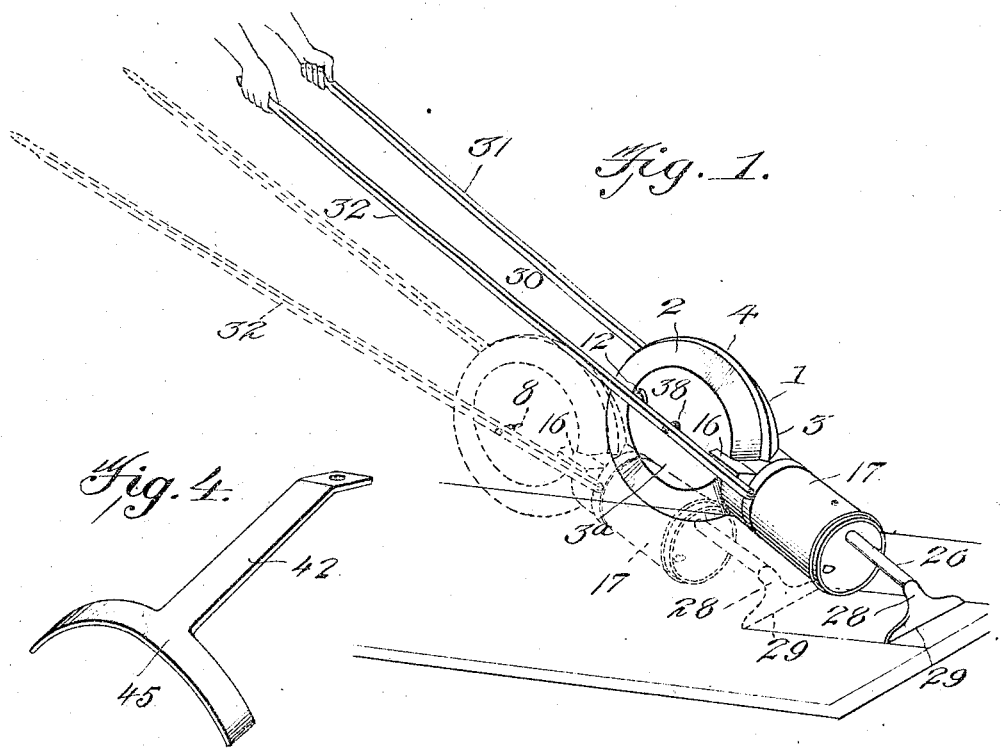
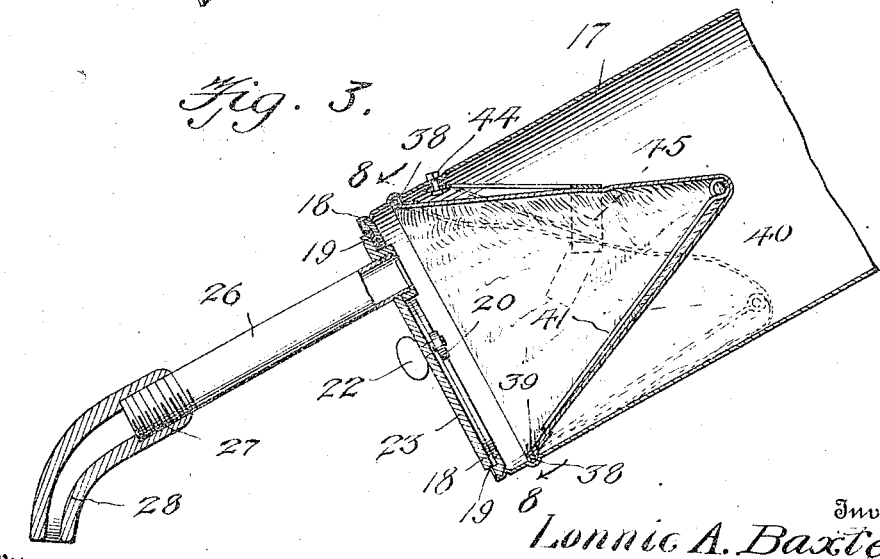

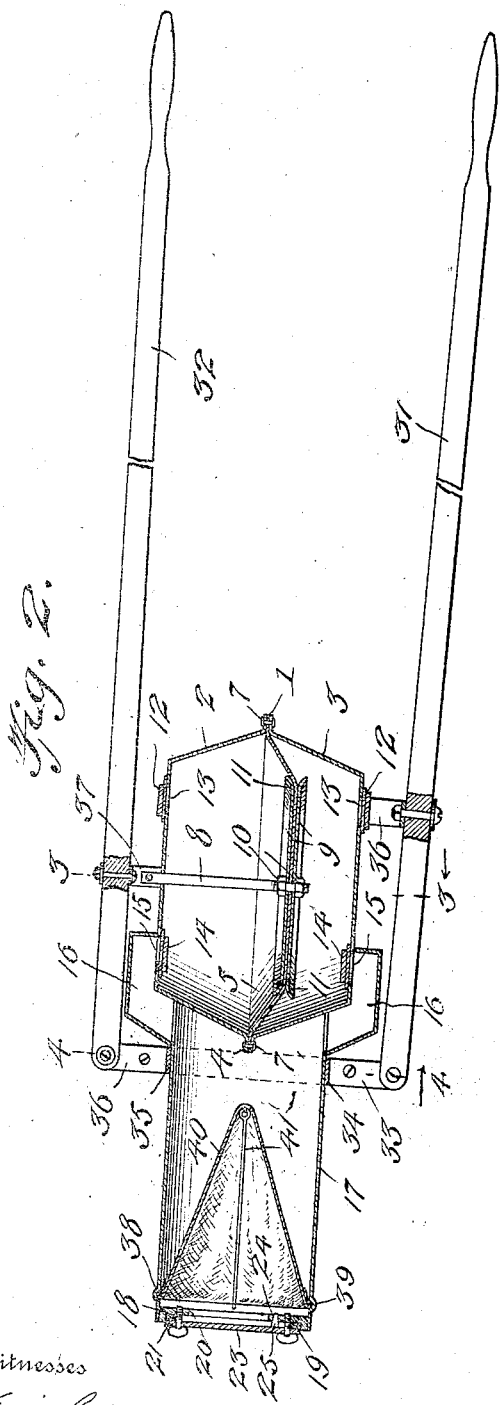

LONNIE A. BAXTER, OF CINCINNATI, OHIO.

VACUUM-CLEANER.

1,026,553.  Specification of Letters Patent.  Patented May 14, 1912.

Application filed March 14, 1911. Serial No. 614,317.

*To all whom it may concern:*

Be it known that I, LONNIE A. BAXTER, a citizen of the United States of America, residing at Cincinnati, in the county of Hamilton and State of Ohio, have invented new and useful Improvements in Vacuum-Cleaners, of which the following is a specification.

This invention relates to vacuum cleaners, and has for an object to provide apparatus of this kind designed for use in removing dust, etc., from floors, carpets or other surfaces and to further provide in the construction of the apparatus means whereby it may be manually propelled and operated by a single person.

Another object of the invention is to provide an improved form of dust chamber constructed with a view of simplifying the emptying of the collecting bag.

In the drawings, forming a portion of this specification and in which like numerals of reference indicate similar parts in the several views:—Figure 1 is a perspective view showing in full lines the position of the apparatus on the out-stroke and showing in dotted lines the position of the apparatus on the in-stroke. Fig. 2 is a longitudinal section through the apparatus. Fig. 3 is a section through the outer end of the dust chamber and through the connecting plate of the suction nozzle. Fig. 4 is a perspective view of the agitator.

The apparatus comprises a pump 1 embodying substantially identically constructed members 2 and 3 provided at their inner ends with peripheral flanged portions 4. The members 2 and 3 of the pump are separated from each other by the diaphragm 5. This diaphragm may be of leather, rubber or any suitable well known material which may be found best adapted for the purpose intended. The outer edge of the diaphragm is secured by rivets or equivalent fastening devices 7 between the peripheral flanged portions 4 of the pump members 2 and 3. The diaphragm actuating rod 8 extends through the head 3ª of the member 2, and as illustrated, the inner end of the rod is provided with companion disks 9 arranged in clamping engagement against the opposite sides of the diaphragm and which are securely held to the rod by the adjusting nuts 10. The disks 9 are provided with oppositely flared outwardly extending peripheral portions 11 which are designed to prevent cutting of the diaphragm on movement of the rod 8.

The head portions of the pump members 2 and 3 are each provided with an outwardly opening check valve 12 in line with the opening 13 and an inwardly opening check valve 14 in line with the opening 15 and in line with the ducts or conveying tubes 16 which connect the respective compartments of the pump 1 with the inner end of the dust chamber 17. The dust chamber 17 preferably comprises an elongated tubular structure secured in any suitable manner at its inner end to the pump members 2 and 3.

At the outer end, the dust chamber 17 is formed to provide an internal shoulder 18 against which is seated a gasket 19, as shown. The shoulder 18 is provided with inwardly extending lugs 20 in which threaded passages 21 are formed. These passages receive the clamping screws 22 on the attaching plate 23 which operate to hold the plate securely against the packing so as to provide a perfect air and dust-tight connection between the plate 23 and the dust chamber. One of the lugs is provided with an opening 24 in which is seated a projection 25 on the inner face of the plate 23. The plate 23 is provided with a conveying tube 26 which is attached to the neck 27 of the section nozzle-head 28. The head 28 may be of any suitable well known form, but as shown, it is provided with a relatively long surface contacting face 29 which may be moved across the surface to be cleaned when the cleaning apparatus is propelled.

The apparatus herein described is provided with a handle 30 embodying a fixed side member 31 and a movable side member 32. The outer end of the fixed side member of the handle is secured to the extension 33 on the section 34 of a clamping band 35 which extends around the chamber 17 at the inner end thereof. The intermediate portion of the fixed side member of the handle is secured to a suitable bracket 36 which extends outwardly from the member 2 of the pump. The movable member of the handle has its outer end pivotally connected to the extension 36 of the section 34 of the clamping band, and as illustrated, the said movable member of the handle is provided with a bracket 37 to which is pivotally connected the outer end of the pump rod 8.

The outer end of the chamber 17, and immediately adjacent to the shoulder 18, is formed to provide a continuous groove 38 in which the spring ring 39 of the dust-collecting bag 40 is seated. This construction permits of the bag being securely applied to and held operatively associated in the chamber. The inner closed end of the bag is provided with a rod 41 whose outer end is disposed in such proximity with respect to the outer end of the chamber as will permit it to be grasped conveniently when the nozzle plate is removed from the dust chamber, thereby enabling the operator to completely turn the bag inside out for the purpose of ejecting the accumulated dust.

In operation of the apparatus, the members 31 and 32 of the handle are grasped in the hand of the operator, as clearly illustrated in Fig. 1 of the drawings, the operator holding the handle members in position for the forward stroke. The operator then moves the apparatus in a forward direction and raises his arms which moves the side members of the handle relatively, actuating the hereinbefore mentioned diaphragm of the pump so as to create the desired suction in the dust chamber and in the nozzle head. The operator after completing the forward stroke moves the apparatus back to the first position, which imparts reverse movement to the diaphragm. It will be understood that a continuous operation of the apparatus, as described, will create a continuous suction in the nozzle head so that an effective collection of the dust will be made in all positions of the apparatus in its movement.

An agitating or shaking device 42 is located within the dust chamber. This device preferably comprises an arm 43 which is connected with the dust chamber by means of the fastening 44, the connection being such as to permit the device to be moved radially of the axis of the dust chamber and into contact with the bag so as to shake the same to beat the dust out of the fiber of the bag and to provide for a perfect free air passage between the fiber of the bag and ducts, movement of the device being obtained wholly by the air suction. The inner end of the arm is provided with a substantially arcuate head 45 which conforms substantially with the curvature of the dust chamber.

I claim:—

1. The combination with a dust collecting chamber, of a vacuum cleaner, of a flexible bag located in the chamber, and an automatic oscillating agitator mounted in the chamber and disposed at one side of the bag, and contacting with the bag to shake the same when suction is applied to the chamber.

2. In a dust collector, a cylinder, a head closing one end of the cylinder, a fabric dust collecting sack mounted in the cylinder and expansible and collapsible when suction is applied to the cylinder, an oscillating beater movably mounted in the cylinder and adapted for beating contact with the sack on expansion and contraction thereof.

3. In a dust collector, a cylinder, a head closing one end of the cylinder and removably fitted thereto, a fabric dust collector sack mounted in the cylinder and expansible and collapsible when suction is applied to the cylinder and an oscillating beater movably mounted in the cylinder, and a withdrawing rod secured to the closed end of the sack and having a manipulating portion disposed in proximity to the head whereby the rod may be engaged by the hand and withdrawn from the cylinder when the head is removed so that the bag also can be partly withdrawn from the cylinder to discharge the dust therefrom.

In testimony whereof I affix my signature in presence of two witnesses.

LONNIE A. BAXTER.

Witnesses:
C. E. BAXTER,
A. R. BAXTER.